United States Patent
Marquardt et al.

(10) Patent No.: US 10,298,553 B2
(45) Date of Patent: May 21, 2019

(54) HARDWARE TRUSTED DATA COMMUNICATIONS OVER SYSTEM-ON-CHIP (SOC) ARCHITECTURES

(71) Applicant: Sprint Communications Company L.P., Overland Park, KS (US)

(72) Inventors: Ronald R. Marquardt, Woodinville, WA (US); Lyle Walter Paczkowski, Mission Hills, KS (US); Arun Rajagopal, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 231 days.

(21) Appl. No.: 15/475,212

(22) Filed: Mar. 31, 2017

(65) Prior Publication Data
US 2018/0288011 A1  Oct. 4, 2018

(51) Int. Cl.
| | |
|---|---|
| H04L 29/06 | (2006.01) |
| H04L 9/32 | (2006.01) |
| G06F 21/44 | (2013.01) |
| G06F 21/57 | (2013.01) |
| G06F 21/60 | (2013.01) |
| G06F 21/72 | (2013.01) |

(52) U.S. Cl.
CPC .......... *H04L 63/0428* (2013.01); *G06F 21/44* (2013.01); *G06F 21/57* (2013.01);
(Continued)

(58) Field of Classification Search
CPC ............. H04L 63/0272; H04L 63/0428; H04L 63/0485; H04L 63/0823; H04L 63/0876;
(Continued)

(56) References Cited

U.S. PATENT DOCUMENTS

| | | | |
|---|---|---|---|
| 7,370,348 B1 | 5/2008 | Patel et al. | |
| 7,469,338 B2 | 12/2008 | Buer | |

(Continued)

FOREIGN PATENT DOCUMENTS

WO  2016166134  10/2016

OTHER PUBLICATIONS

ETSI; "Network Function Virtualisation (NFV); Trust; Report on Attestation Technologies and Practices for Secure Deployments;" Group Specification; Feb. 18, 2017; pp. 1-27; Draft ETSI GS NFV SEC 007 V0.0.7; ETSI; Sophia Antipolis Cedex, France.

(Continued)

*Primary Examiner* — Jeffrey C Pwu
*Assistant Examiner* — Thong P Truong

(57) ABSTRACT

A System-On-Chip (SOC) exchanges hardware trusted data communications. A Central Processing Unit (CPU) executes an internal application. A transceiver receives a data message from an external data application for the internal data application. The message has encrypted user data and an encrypted hardware trust certificate for the external data application. The transceiver decrypts the hardware trust certificate for the external data application and transfers the decrypted hardware trust certificate to a SOC kernel. The transceiver decrypts the user data. The SOC kernel validates the decrypted hardware trust certificate for the external data application and notifies the transceiver. The transceiver transfers the decrypted user data to the CPU for delivery to the internal data application responsive to the notification from the SOC kernel.

20 Claims, 10 Drawing Sheets

(52) U.S. Cl.
CPC .......... *G06F 21/602* (2013.01); *G06F 21/606* (2013.01); *G06F 21/72* (2013.01); *H04L 9/3263* (2013.01); *H04L 9/3271* (2013.01); *H04L 63/0272* (2013.01); *H04L 63/0485* (2013.01); *H04L 63/0823* (2013.01); *H04L 63/0876* (2013.01); *H04L 63/126* (2013.01); *G06F 2221/2103* (2013.01)

(58) Field of Classification Search
CPC ... H04L 63/126; H04L 9/3263; H04L 9/3271; G06F 21/44; G06F 21/57; G06F 21/602; G06F 21/606; G06F 21/72
See application file for complete search history.

(56) References Cited

U.S. PATENT DOCUMENTS

| | | | |
|---|---|---|---|
| 7,587,587 | B2 | 9/2009 | Buer et al. |
| 7,826,614 | B1 * | 11/2010 | Kaniz .................. H04L 9/0637 380/28 |
| 8,099,629 | B2 | 1/2012 | Feng |
| 8,356,188 | B2 | 1/2013 | Kudelski |
| 8,458,791 | B2 | 6/2013 | Do et al. |
| 8,775,757 | B2 | 7/2014 | Polzin et al. |
| 9,317,708 | B2 | 4/2016 | Lee et al. |
| 2006/0059372 | A1 | 3/2006 | Fayar et al. |
| 2009/0210719 | A1 | 8/2009 | Yoshida |
| 2014/0112471 | A1 | 4/2014 | Pendakur et al. |
| 2014/0310536 | A1 | 10/2014 | Shacham |
| 2015/0261965 | A1 | 9/2015 | Brumley et al. |
| 2016/0378996 | A1 | 12/2016 | Smith et al. |
| 2017/0054565 | A1 | 2/2017 | Feng et al. |

OTHER PUBLICATIONS

ETSI; "Network Functions Virtualisation (NFV); NFV Security; Security and Trust Guidance;" Group Specification; Dec. 2014; pp. 1-57; ETSI GS NFV-SEC 003 V1.1.1; ETSI; Sophia Antipolis Cedex, France.

* cited by examiner

HARDWARE TRUSTED DATA COMMUNICATIONS OVER SYSTEM-ON-CHIP (SOC) ARCHITECTURES

TECHNICAL BACKGROUND

Many computer architectures have Central Processing Units (CPUs), Random Access Memory (RAM), persistent data storage, Input/Output (I/O) transceivers, bus interfaces, and user interfaces. The CPUs retrieve software from their own internal storage, the RAM, and the persistent data storage. The CPUs execute the software to drive the I/O transceivers and user the interfaces. For example, a CPU may retrieve and execute a crypto software application that encrypts and decrypts user data. Some computer architectures have been reduced to a single integrated circuit form factor that is called a System-On-Chip (SOC). The typical SOC has CPU cores, RAM, data storage, I/O transceivers, and bus interfaces. SOCs may include additional components like Graphics Processing Units (GPUs), Direct Memory Access (DMA) controllers, and the like.

Encryption protects data communications by mathematically and logically hashing data with a secret key to generate a hash result. In some encryption examples like digital signatures, a public key may be used to decrypt this hash result and recover the original data. In other encryption examples, the entities share secret keys that are used to encrypt and decrypt the data. Hardware-based encryption embeds most of this crypto processing in hardware circuitry. The circuitry comprises hardware like data registers, logic gates, multiplexers, clocks, and the like. The hardware circuitry can generate random numbers and secret keys, receive and transfer numbers and keys, and use the keys to encrypt and decrypt data. SOC I/O transceivers use hardware-based encryption to communicate over Local Area Networks (LANs) and Wide Area Networks (WANs). The SOC I/O transceivers may also use hardware based encryption for internal security with other SOC components.

Hardware trust entails the physical validation of the computer hardware that is executing computer software. The computer hardware, like a CPU, has an identity code that is shared secret key. A hardware trust server also knows the shared secret key. The hardware trust server issues random number challenges to software that is executing on the computer hardware. The software that is executing on the hardware hashes the random number with the shared secret key to return a hardware trust result to the hardware trust server. The hardware trust server hashes the same random number with the shared secret key to generate the same hardware trust result. If the hardware trust results match, then the software application has hardware trust. The process can be repeated to refresh the hardware trust for the software application.

The hardware trust server may also digitally sign and issue hardware trust certificates to the software application as it achieves and maintains hardware trust. The software application may then share its hardware trust digital certificates with other entities to demonstrate hardware trust by the hardware trust server. The other entities may use a public key for the hardware trust server to decrypt and validate the hardware trust digital certificates for the software application.

Unfortunately, the integration of hardware trust with SOC I/O transceivers that use hardware-based encryption is not yet efficient and effective. The hardware-based encryption complicates hardware trust validation in the SOC. Without hardware trust, a rogue entity may spoof the hardware-based encryption in the SOC I/O transceiver system and gain access to internal SOC components. The problem is especially acute in a Network Function Virtualization (NFV) data communication network that needs to have hardware trust of its Virtual Network Functions (VNFs). The VNFs also need to have hardware trust of other VNFs and user devices.

Technical Overview

A System-On-Chip (SOC) exchanges hardware trusted data communications. A Central Processing Unit (CPU) executes an internal data application. An I/O transceiver receives a data message from an external data application for the internal data application. The message has encrypted user data and an encrypted hardware trust certificate for the external data application. The transceiver decrypts the hardware trust certificate for the external data application and transfers the decrypted hardware trust certificate to a SOC kernel. The SOC kernel validates the decrypted hardware trust certificate for the external data application and notifies the I/O transceiver. The I/O transceiver decrypts the user data. The I/O transceiver transfers the decrypted user data to the CPU for delivery to the internal data application in response to the notification form the SOC kernel.

DETAILED DESCRIPTION

Figure 1:
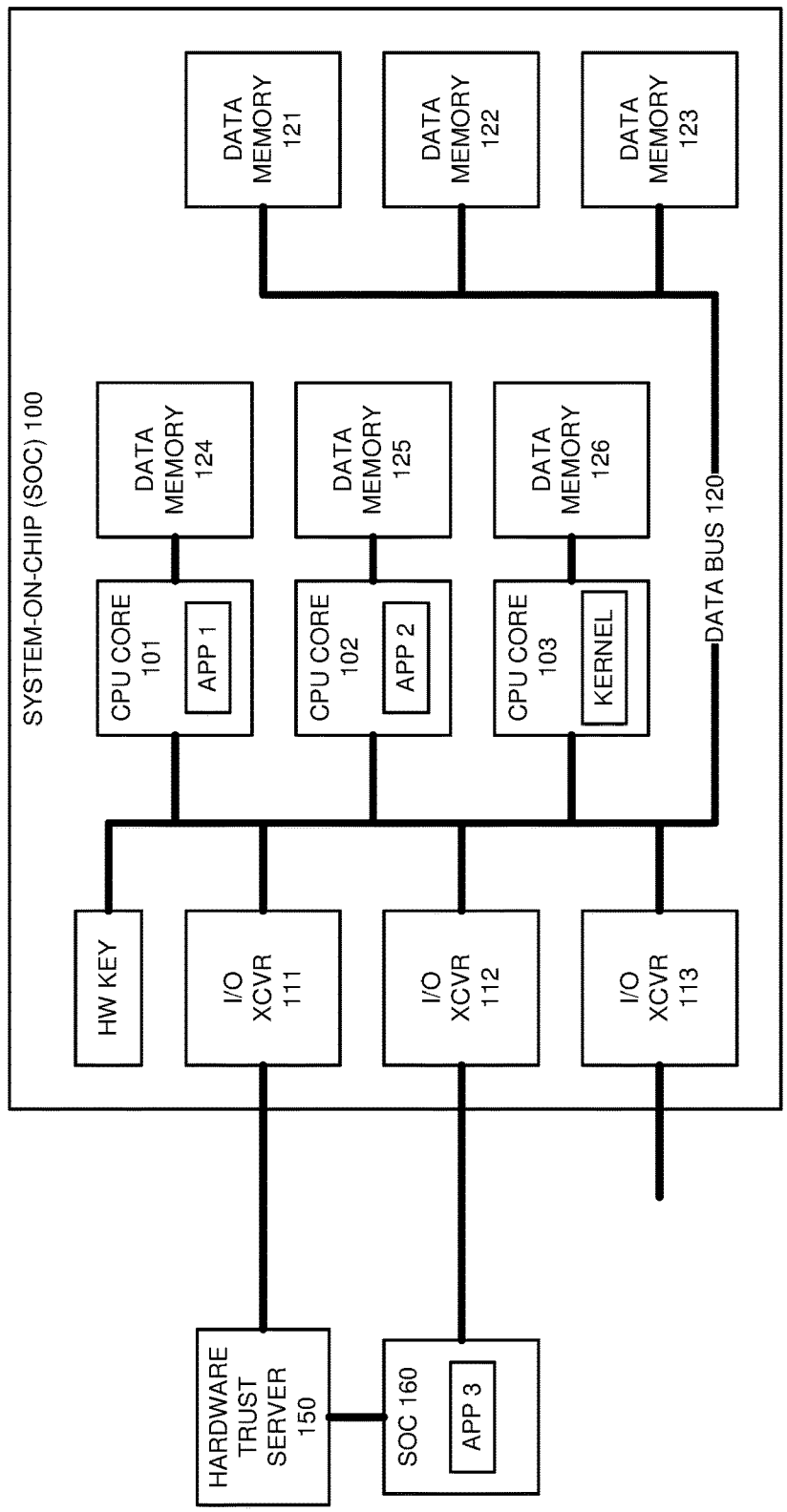
FIG. 1 illustrates a data communication System-On-Chip (SOC) to exchange hardware trusted data communications.

FIG. 1 illustrates System-On-Chip (SOC) 100 to exchange hardware trusted data communications. SOC 100 comprises Central Processing Unit (CPU) cores 101-103, Input/Output (I/O) transceivers (XCVRs) 111-113, data bus 120, and data memories 121-126. CPU core 101 executes data application #1 (APP #1). CPU core 102 executes data application #2 (APP #2). CPU core 103 executes a SOC kernel.

SOC 100 has a secret, physically-embedded, read-only hardware trust (HW) key. Although shown coupled to data bus 120 for clarity, the hardware trust key may be embedded elsewhere in SOC 100, such as CPU core 103 or data memory 126. Hardware trust server 150 also stores the hardware key. SOC 160 is configured in a similar manner to SOC 100 and executes data application #3 (APP #3). SOC 160 has its own secret, physically-embedded, read-only hardware trust key that is also known to hardware trust server 150.

CPU cores 101-103 comprise micro-processing circuitry like logic units, control units, I/O lines, and data registers. The SOC kernel comprises hardware drivers, memory controllers, timers, interrupt interfaces, interrupt controllers, schedulers, boot-up instructions, and the like. APPs #1-3 comprise data communication software with a few examples being servers, databases, and social networks. The APPs and the SOC kernel are stored in data memories 121-126 and are loaded into CPU cores 101-103 for execution.

I/O transceivers 111-113 comprise communication ports, encryption/decryption circuitry, control circuitry, memory, signal processing circuitry, and software. I/O transceivers 111-113 may use protocols like Institute of Electrical and Electronics Engineers (IEEE) 802.3, Universal Serial Bus, IEEE 802.11, Personal Area Network (PAN), Universal Synchronous/Asynchronous Receiver/Transmitter (USART), Wave Division Multiplexing (WDM), Long Term Evolution (LTE), Integrated Circuit Card (ICC), and the like. The encryption/decryption circuitry performs hardware-based encryption and decryption. To handle the crypto tasks, the encryption/decryption circuitry in I/O transceivers 111-113 generates and shares encryption keys with the encryption/decryption circuitry in other I/O transceivers.

Data bus 120 comprises metallic and/or optical data links along with integrated control circuitry and software. Data memories 121-126 comprise Random Access Memory (RAM), flash memory, or some other data storage device.

Hardware trust server 150 comprises a computer system to establish and maintain hardware trust for APPs #1-3. Hardware trust server 150 maintains networking data that associates APPs #1-3 with their current executing SOCs. For example, a network controller may periodically transfer network data to server 150 that indicates the current network software execution environment for multiple SOCs. Hardware trust server 150 may distribute networking data to the SOC kernel and to other SOC kernels that associates APPs 1-3 with their current MAC IDs and/or VPN IDs. Hardware trust server 150 may also distribute crypto keys to the SOC kernels for use in encrypting and decrypting the hardware trust certificates, MAC IDs, and VPN IDs. In addition, hardware trust server 150 distributes crypto keys to the SOC kernels to decode and validate the hardware trust server's digital signature.

To maintain hardware trust of APP #1, hardware trust server 150 issues a random number challenge to APP #1 over I/O transceiver 111 and CPU core 101. APP #1 drives CPU core 101 to request hardware trust data from the SOC kernel based on the random number challenge. Driven by the SOC kernel, CPU core 103 reads the hardware trust key and hashes the random number challenge with the hardware trust key to generate a hardware trust result. The SOC kernel transfers the hardware trust result to APP #1, and APP #1 transfers the hardware trust result to hardware trust server 150.

Based on its current networking environment data, hardware trust server 150 generates its own hardware trust result with the same random number and hardware trust key for SOC 100. Hardware trust server 150 matches the hardware trust result from APP #1 with its own result to validate hardware trust of APP #1 in SOC 100. In response to hardware trust validation, hardware trust server 150 issues a hardware trust certificate to APP #1 that is time-stamped and digitally signed by hardware trust server 150.

Hardware trust server 150 and APP #1 will repeat this process to refresh hardware trust and maintain fresh hardware trust certificates for APP #1 on its current SOC. In addition to hardware trust data, APP #1 may report its current Media Access Control Identifier (MAC ID) and/or Virtual Private Network Identifier (VPN ID) to hardware trust server 150 for distribution to SOC 100 and other SOCs. Hardware trust server 150 and APPs #2-3 perform a similar process to maintain valid hardware trust certificates for APPs #2-3 on their current SOCs.

In an exemplary operation, APP #3 sends a hardware trusted data message to APP #1 in SOC 100. The hardware trusted data message has a message header, encrypted user data, and an encrypted hardware trust certificate. The hardware trust certificate is for APP #3. I/O transceiver 112 receives the data message. Based on header data or some other trigger, I/O transceiver 112 breaks out the encrypted hardware trust certificate for APP #3 from the encrypted user message based on data location, pointer, or marker. I/O transceiver 112 decrypts the hardware trust certificate for APP #3 and transfers the decrypted hardware trust certificate to the SOC kernel in CPU core 103.

The SOC kernel drives CPU core 103 to use a known digital signature key for hardware trust server 150 to decode and validate the hardware trust certificate for APP #3. In response to the hardware trust of APP #3, the SOC kernel drives CPU core 103 to transfer an instruction to I/O transceiver 112 to transfer decrypted user data to APP #1 in CPU core 101. I/O transceiver 112 decrypts the encrypted user data and transfers the decrypted user data to CPU core 101. CPU core 101 delivers the decrypted user data to APP #1.

In some examples, APP #3 may also encrypt and insert its MAC ID and/or VPN ID into the data message. I/O transceiver 112 receives the data message and breaks out the encrypted MAC ID and/or VPN ID for APP #3 along with the hardware trust certificate. I/O transceiver 112 transfers the decrypted MAC ID and/or VPN ID for APP #3 along with the hardware trust certificate to the SOC kernel in CPU core 103. The SOC kernel drives CPU core 103 to validate the MAC ID and/or VPN ID for APP #3 using networking data from hardware trust server 150. In response to both the hardware trust and the valid MAC ID and/or VPN ID for APP #3, the SOC kernel drives CPU core 103 to transfer the instruction to I/O transceiver 112 to transfer the decrypted user data to CPU core 101.

Likewise, APP #3 may also encrypt and insert the hardware trust certificate for APP #1 into the data message. I/O transceiver 112 receives the data message and breaks out the encrypted hardware trust certificate for APP #1 along with the certificate for APP #3. I/O transceiver 112 transfers the decrypted hardware trust certificate for APP #1 along with the certificate for APP #3 to the SOC kernel in CPU core 103. The SOC kernel drives CPU core 103 to validate the hardware trust certificate for APP #1. In response to the hardware trust for both APP #1 and APP #3, the SOC kernel drives CPU core 103 to transfer the instruction to I/O transceiver 112 to transfer the decrypted user data to CPU core 101.

In another exemplary operation, APP #1 in SOC 100 sends a hardware trusted data message to APP #3 in SOC 160. The hardware trusted data message has a header, encrypted user data, and an encrypted hardware trust certificate for APP #1. To initiate the data message, APP #1 transfers its hardware trust certificate in a data transfer request through CPU core 101 to the SOC kernel in CPU core 103. Hardware trust validation may be omitted in transmitting SOC 100 and applied at receiving SOC 160. In this example, transmitting SOC 100 performs hardware trust validation, so the SOC kernel drives CPU core 103 to use a known key for hardware trust server 150 to validate the hardware trust certificate for APP #1.

In response to the hardware trust of APP #1, the SOC kernel drives CPU core 103 to transfer instructions to CPU core 101 and I/O transceiver 112 to transfer user data from APP #1 in a hardware trusted data message to APP #3 in SOC 160. The instructions direct I/O transceiver 112 to encrypt the hardware trust certificate for APP #1, encrypt the user data, and indicate encrypted hardware trust in the data message header. CPU core 101 transfers the user data to I/O transceiver 112. I/O transceiver 112 encrypts the user data and the hardware trust certificate for APP #1. I/O transceiver 112 transfers a hardware trusted data message to APP #3 in SOC 160. The data message transports the encrypted user data and the encrypted hardware trust certificate for APP #1.

In some examples, APP #1 may also insert its MAC ID and/or VPN ID into the data message. CPU core 101 transfers the MAC ID and/or VPN ID to the SOC kernel along with its hardware trust certificate. The SOC kernel may drive CPU core 103 to validate the MAC ID and/or VPN ID for APP #1 using networking data from hardware trust server 150. In response to the hardware trust for both APP #1 and its MAC ID and/or VPN ID, the SOC kernel drives CPU core 103 to transfer instructions to CPU core 101 and I/O transceiver 112 to transfer the user data in the data message to APP #3. The instructions direct I/O transceiver 112 to encrypt the MAC ID and/or VPN ID for APP #1.

Likewise, APP #1 may also insert the hardware trust certificate for APP #3 into the data message. CPU core 101 transfers the hardware trust certificate for APP #3 to the SOC kernel along with its hardware trust certificate. The SOC kernel may drive CPU core 103 to validate the hardware trust certificate for APP #3 using the known key for hardware trust server 150. In response to the hardware trust for both APP #1 and APP #3, the SOC kernel drives CPU core 103 to transfer instructions to CPU core 101 and I/O transceiver 112 to transfer the user data in the data message to APP #3. The instructions to I/O transceiver 112 direct the encryption of the hardware trust certificate for APP #3.

The use of hardware trusted communications may be selective and independent of user data encryption. For example, the data message may have a header flag, network address, network port, or some other networking marker that directs the transceiver to perform the hardware trust break-out and validation through the SOC kernel. This selective use of hardware trusted communications may be implemented for special commands between data applications like server control operations, Software Defined Network (SDN) signaling, Wake-on-LAN (WoL) commands, wireless keyboard controllers, and the like.

Figure 2:
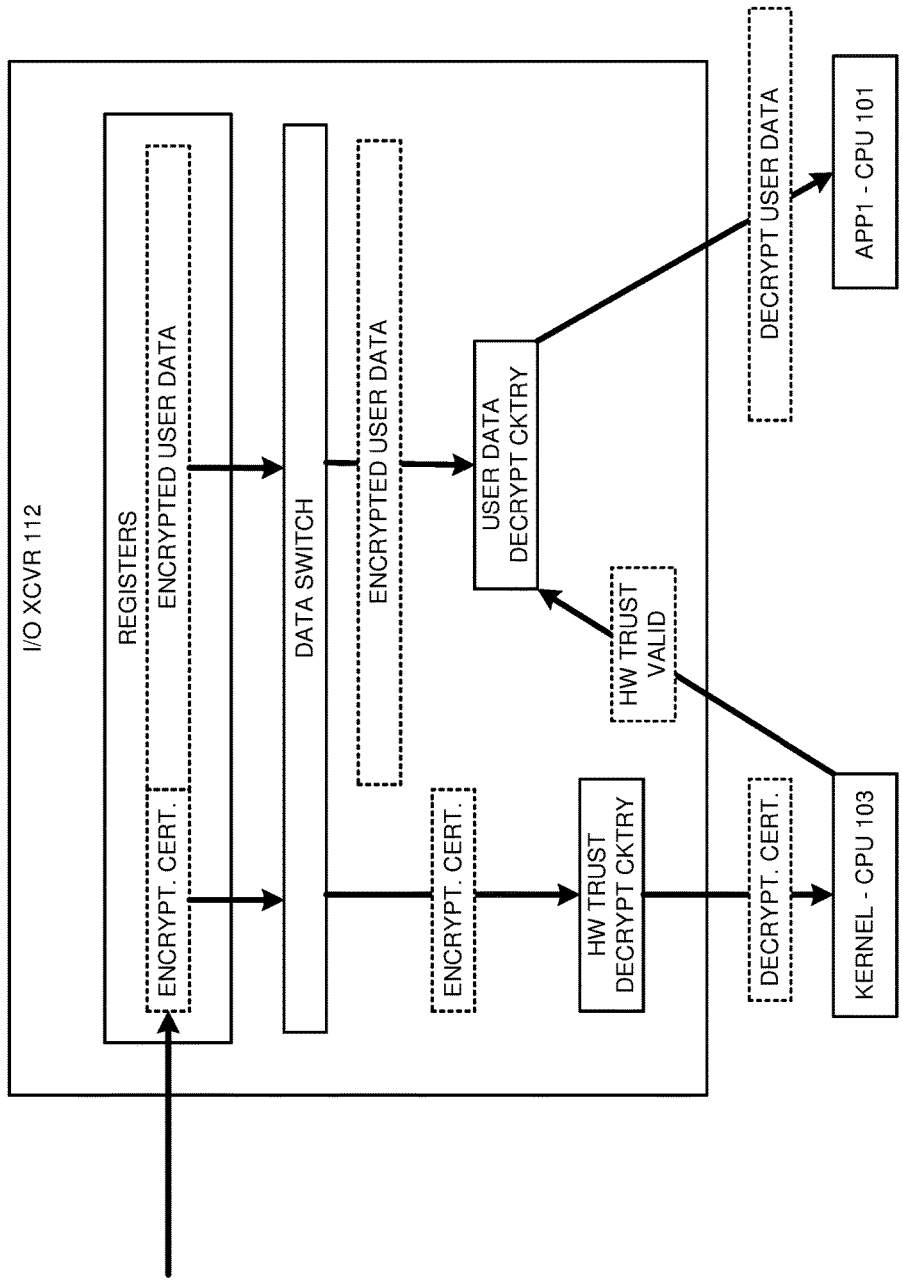
FIG. 2 illustrates an I/O transceiver in the SOC to receive hardware trusted data communications.

FIG. 2 illustrates I/O transceiver 112 in SOC 100 to receive hardware trusted data communications. I/O transceiver 112 transfers the block of encrypted data from the hardware trusted data message into a set of data storage registers. The data storage registers transfer the encrypted data block to a data switch. Based on the preconfigured size and location of the encrypted hardware trust certificate relative to the encrypted user data, the data switch transfers the encrypted hardware trust certificate to hardware trust decryption circuitry. The hardware trust decryption circuitry decrypts the hardware trust certificate and transfers the decrypted hardware trust certificate for APP #3 to the SOC kernel in CPU core 103. The SOC kernel uses the key for hardware trust server 150 to validate the hardware trust certificate for APP #3—typically by decrypting the hardware trust server's digital signature with its known key and then matching the decrypted data to expected data. In response to the hardware trust of APP #3, the SOC kernel in CPU core 103 transfers an instruction to the user data decryption circuitry to transfer decrypted user data to CPU core 101. The user data decryption circuitry decrypts the encrypted user data and transfers the decrypted user data to CPU core 101. CPU core 101 delivers the decrypted user data to APP #1. Additional data for APP #3 like MAC ID and VPN ID may be added to the hardware trusted data message and validated by SOC 100.

Figure 3:
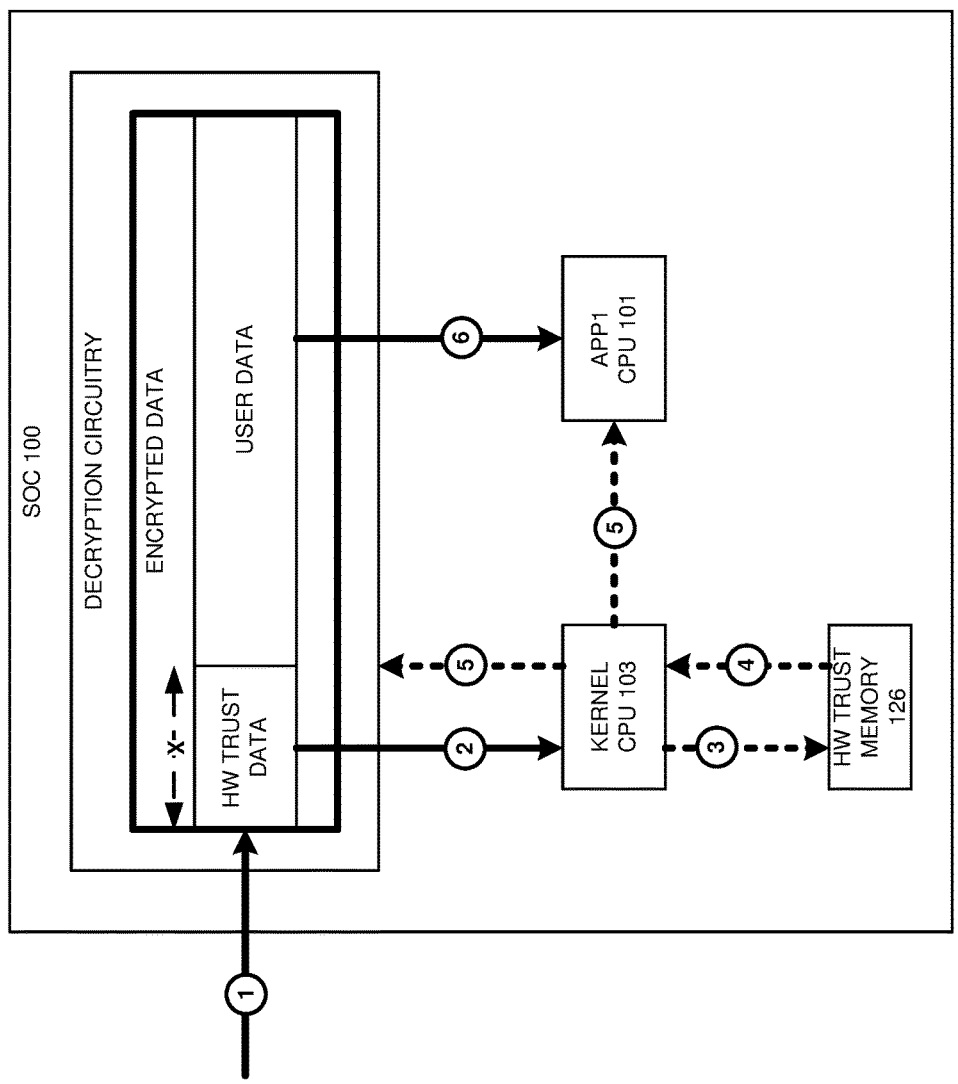
FIG. 3 illustrates another version of the SOC to receive hardware trusted data communications.

FIG. 3 illustrates another version of SOC 100 to receive hardware trusted data communications. In this example, the SOC kernel decrypts the hardware trust certificate. To support this crypto task, the SOC kernels in SOC 100 and 160 establish and share hardware trust data encryption keys. Based on the preconfigured size and location (X) of the encrypted hardware trust certificate relative to the encrypted user data, the decryption circuitry transfers the encrypted hardware trust certificate for APP #3 to the SOC kernel in CPU core 103. The SOC kernel in CPU core 103 retrieves hardware trust decryption data from its hardware trust database in data memory 126. The SOC kernel in CPU core 103 decrypts the hardware trust certificate with the hardware trust decryption data. The SOC kernel then uses the known key for hardware trust server 150 to validate the hardware trust certificate for APP #3. In response to the hardware trust of APP #3, the SOC kernel in CPU core 103 transfers an instruction to the decryption circuitry to decrypt and transfer the user data to CPU core 101. The SOC kernel transfers an instruction to CPU 101 to receive the decrypted user data for APP #1. The decryption circuitry decrypts the encrypted user data and transfers the decrypted user data to CPU core 101. CPU core 101 delivers the decrypted user data to APP #1. Additional data for APP #3 like MAC ID and VPN ID may be added to the hardware trusted data message and validated by SOC 100 before the decrypted data is transferred to APP #1.

Figure 4:
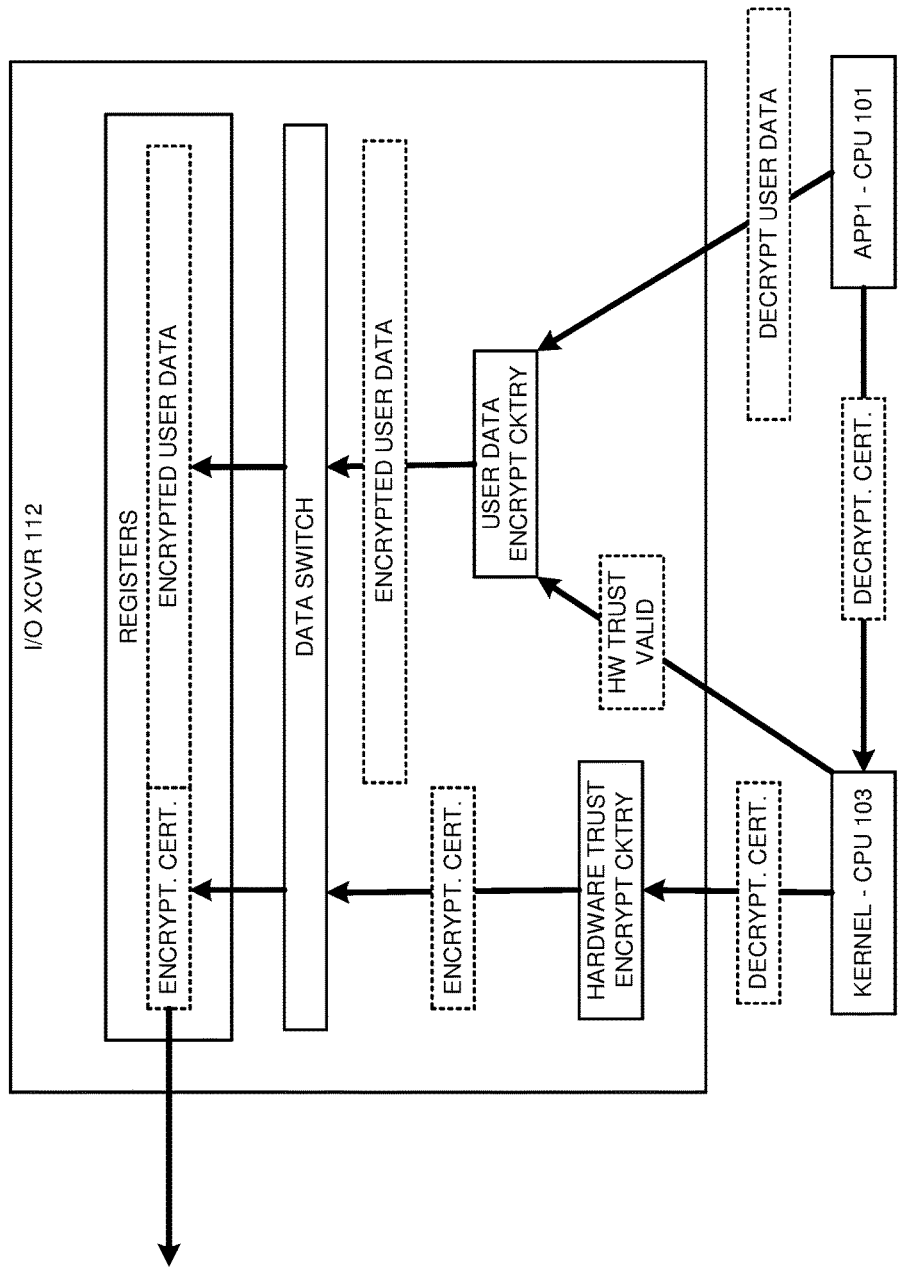
FIG. 4 illustrates an I/O transceiver in the SOC to transfer hardware trusted data communications.

FIG. 4 illustrates I/O transceiver 112 in SOC 100 to transfer hardware trusted data communications. APP #1 in CPU core 101 transfers its hardware trust certificate in a data transfer request to the SOC kernel in CPU core 103. APP #1 also transfers user data to user data encryption circuitry in I/O transceiver 112. The SOC kernel uses the known key for hardware trust server 150 to validate the hardware trust certificate for APP #1—typically by decrypting the server 150 digital signature and matching the decrypted data to expected data. In response to the hardware trust of APP #1, the SOC kernel in CPU core 103 transfers an instruction to CPU 101 to transfer the user data to the user data encryption circuitry. The SOC kernel also transfers an instruction to the user data encryption circuitry in I/O transceiver 112 to encrypt and transfer the user data. The user data encryption circuitry encrypts the user data and transfers the encrypted user data to a data switch.

The SOC kernel also transfers an instruction to hardware trust encryption circuitry in I/O transceiver 112 to encrypt and transfer the hardware trust certificate. The hardware trust encryption circuitry encrypts the hardware trust certificate and transfers the encrypted hardware trust certificate to the data switch. The data switch switches the encrypted data to position the encrypted hardware trust certificate relative to the encrypted user data in the data storage registers. I/O transceiver 112 then transmits the encrypted user data and the encrypted hardware trust certificate in the hardware trusted data message. Additional data for APP #1 like MAC ID and VPN ID may be validated by SOC 100 and added to the hardware trusted data message.

Figure 5:
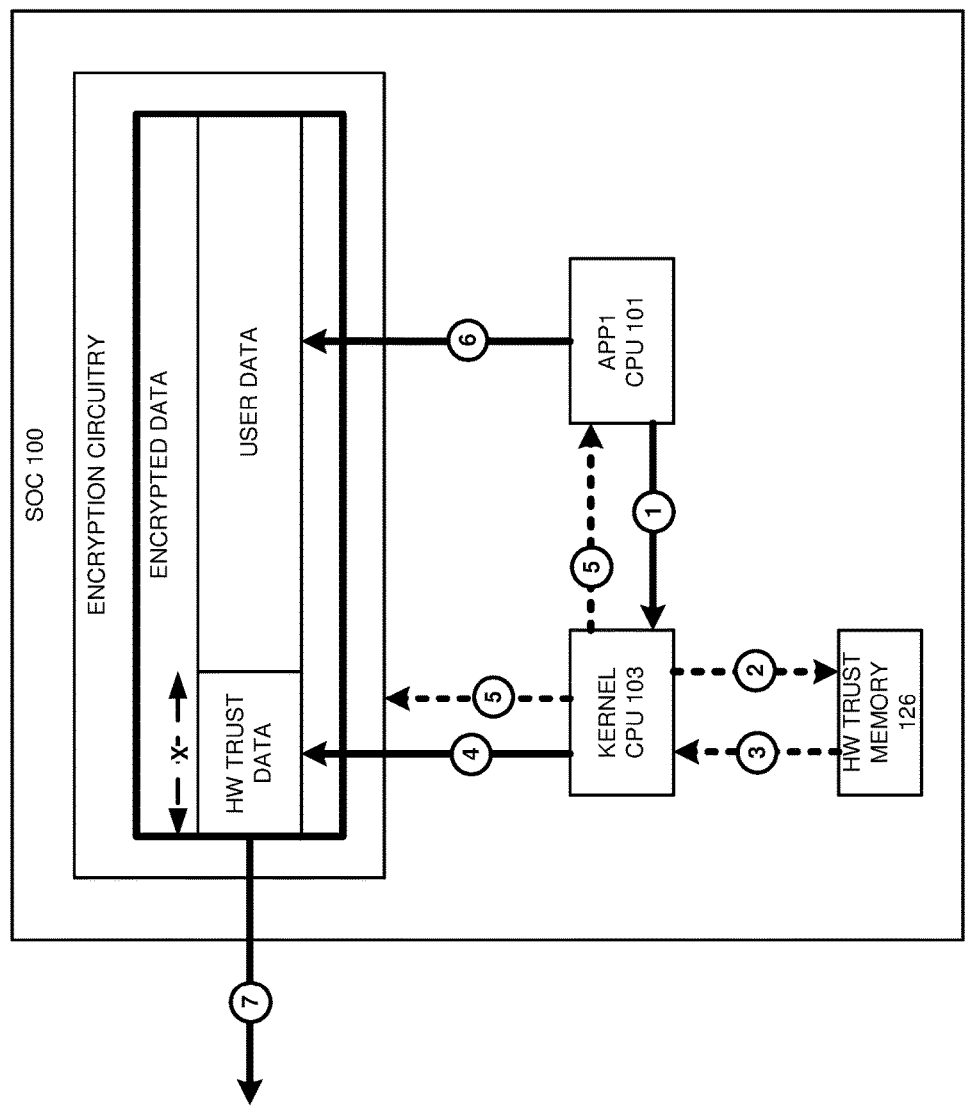
FIG. 5 illustrates another version of the SOC to transfer hardware trusted data communications.

FIG. 5 illustrates another version of SOC 100 to transfer hardware trusted data communications. In this example, the SOC kernel encrypts the hardware trust certificate. To support this crypto task, the SOC kernels in SOC 100 and 160 establish and share hardware trust data encryption keys. APP #1 in CPU core 101 transfers its hardware trust certificate in a data transfer request to the SOC kernel in CPU core 103. The SOC kernel uses the key for hardware trust server 150 to validate the hardware trust certificate for APP #1. The SOC kernel retrieves encryption data from its hardware trust database in data memory 126. The SOC kernel encrypts the hardware trust certificate for APP #1 based on the encryption data. The SOC kernel transfers the encrypted hardware trust certificate for APP #1 to the encryption circuitry. The SOC kernel in CPU core 103 transfers an instruction to CPU 101 to transfer the user data. The SOC kernel also transfers an instruction to the encryption circuitry to encrypt and transfer the user data. The encryption circuitry encrypts the user data and transfers the encrypted user data along with the encrypted hardware trust certificate for APP #1. Additional data for APP #1 like MAC ID and VPN ID may be validated by SOC 100 and added to the hardware trusted data message.

Figure 6:
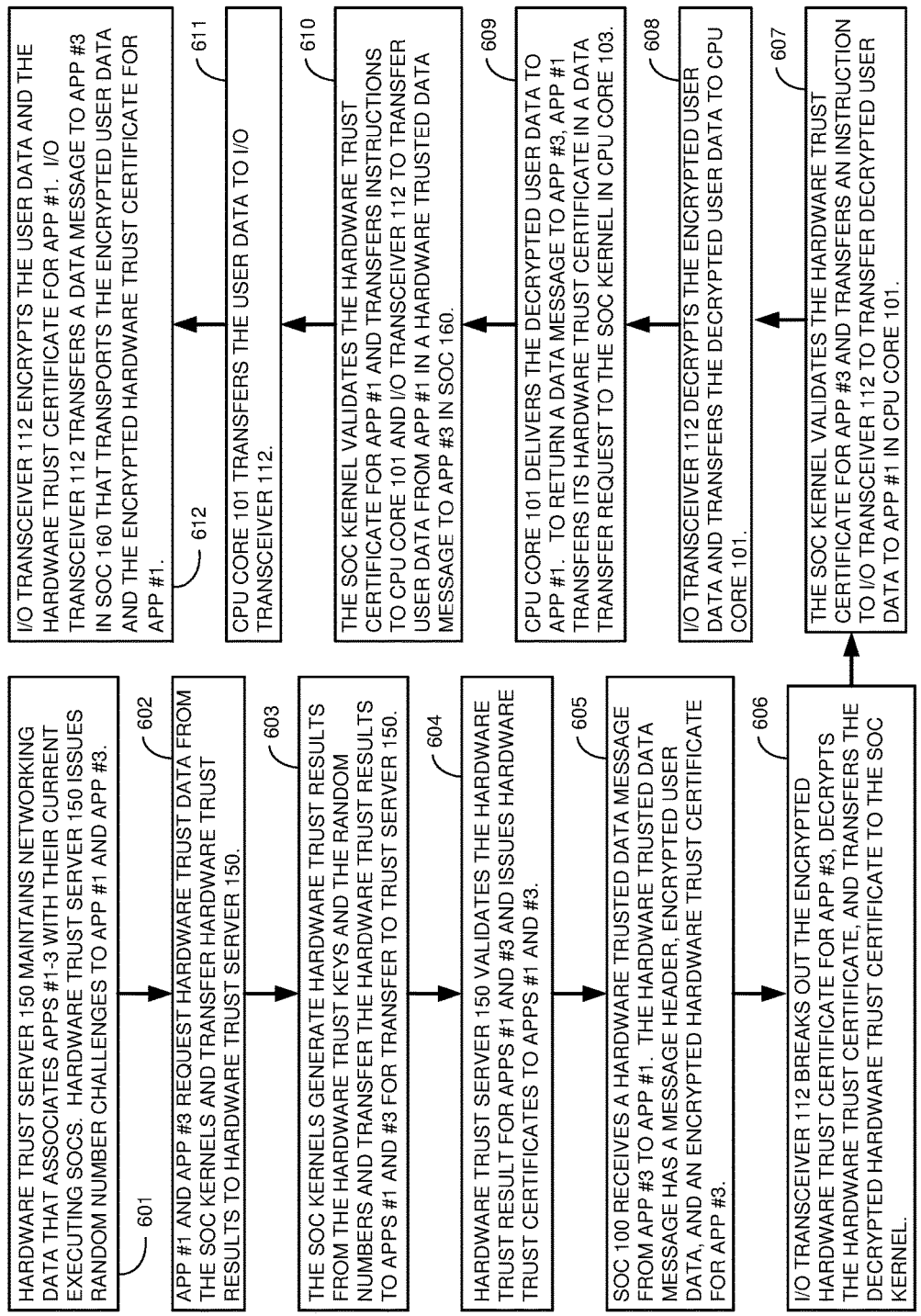
FIG. 6 illustrates the operation of the data communication SOC to exchange hardware trusted data communications.

FIG. 6 illustrates the operation of data communication SOC 100 to exchange hardware trusted data communications. Hardware trust server 150 maintains networking data that associates APPs #1-3 with their current executing SOCs (601). Hardware trust server 150 issues a random number challenges to APP #1 and APP #3 (601). APPs #1 and #3 request hardware trust data from their SOC kernels (602). The SOC kernels generate hardware trust results from their hardware trust keys and the random numbers (603). The SOC kernels transfer the hardware trust results to APP #1 and APP #3 (603). APP #1 and APP #3 transfer the hardware trust results to hardware trust server 150. Hardware trust server 150 validates hardware trust of both APP #1 and APP #3 (604). In response to hardware trust validation, hardware trust server 150 issues a hardware trust certificates to APPs #1 and #3 (604).

SOC 100 receives a hardware trusted data message from APP #3 to APP #1. The hardware trusted data message has a message header, encrypted user data, and an encrypted hardware trust certificate for APP #3 (605). I/O transceiver 112 breaks out the encrypted hardware trust certificate for APP #3 from the encrypted user message (606). I/O transceiver 112 decrypts the hardware trust certificate for APP #3 and transfers the decrypted hardware trust certificate to the SOC kernel (606). The SOC kernel validates the hardware trust certificate for APP #3 (607). In response to the hardware trust of APP #3, the SOC kernel transfers an instruction to I/O transceiver 112 to transfer decrypted user data to APP #1 (607). I/O transceiver 112 decrypts the encrypted user data and transfers the decrypted user data to CPU core 101 (608). CPU core 101 delivers the decrypted user data to APP #1 (609).

APP #1 returns a hardware trusted data message to APP #3 in SOC 160 (609). The hardware trusted data message has a header, encrypted user data, and an encrypted hardware trust certificate for APP #1 (609). To initiate the data message, APP #1 transfers its hardware trust certificate in a data transfer request to its SOC kernel (609). Although hardware trust validation in the transmitting SOC could be omitted, the SOC kernel validates the hardware trust certificate for APP #1 in this example (610). In response to the hardware trust of APP #1, the SOC kernel transfers instructions to CPU core 101 and I/O transceiver 112 to transfer user data from APP #1 in a hardware trusted data message to APP #3 in SOC 160 (610). CPU core 101 transfers the user data to I/O transceiver 112 (611). I/O transceiver 112 encrypts the hardware certificate for APP #1 and encrypts the user data (612). I/O transceiver 112 indicates encrypted hardware trust in the data message header (612). I/O transceiver 112 transfers a data message to APP #3 in SOC 160 that transports the encrypted user data and the encrypted hardware trust certificate for APP #1 (612).

Figure 7:
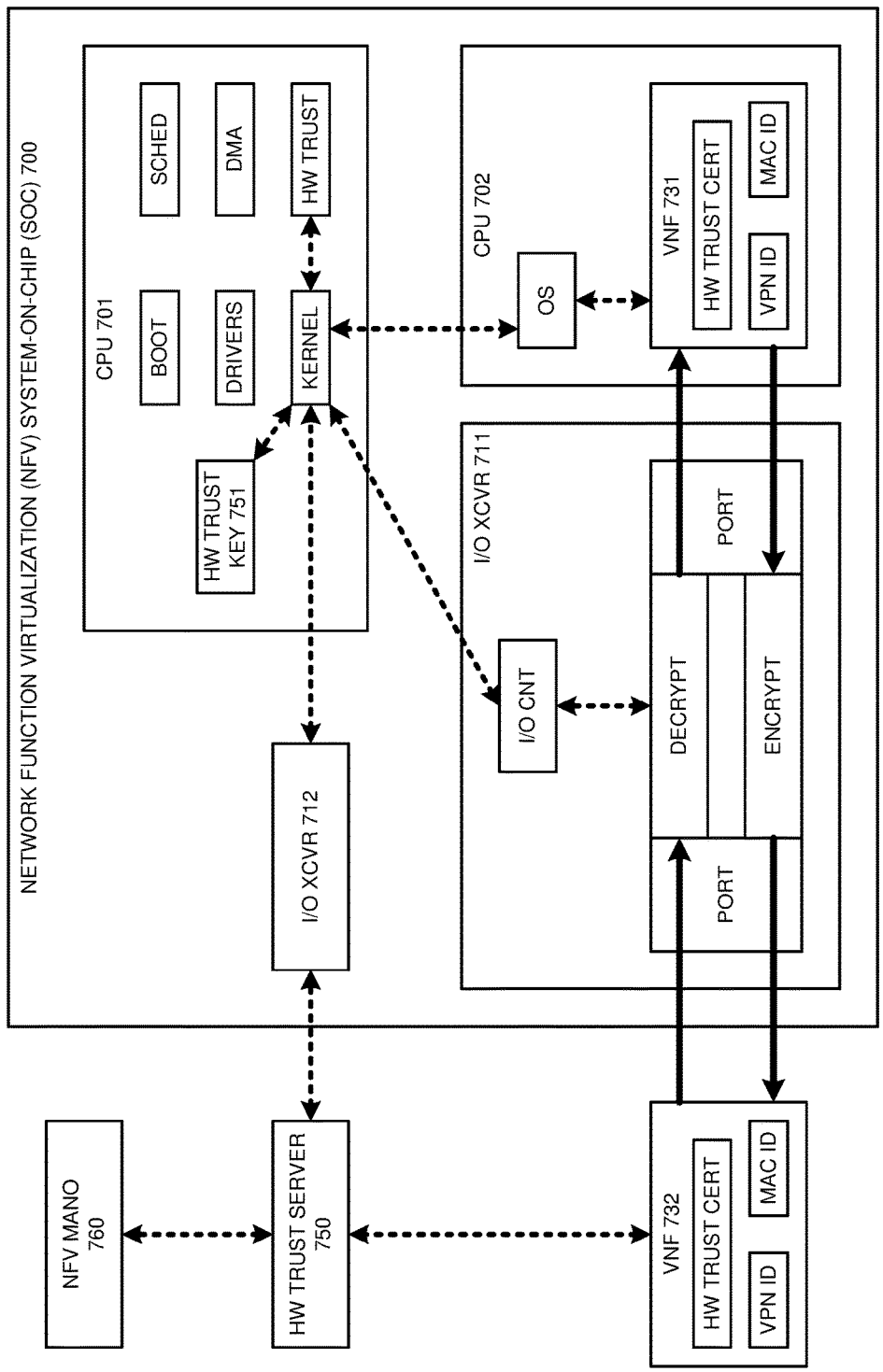
FIG. 7 illustrates a Network Function Virtualization (NFV) SOC to exchange hardware trusted data communications.

FIG. 7 illustrates Network Function Virtualization (NFV) SOC 700 to exchange hardware trusted data communications. NFV SOC 700 comprises CPUs 701-702 and I/O transceivers 711-712. CPU 701 executes a SOC kernel and its kernel modules like boot-up instructions, hardware drivers, processing schedulers, Direct Memory Access (DMA) controllers, and hardware trust kernel modules. CPU 701 has hardware trust key 751 that is also known to hardware trust server 750. Hardware trust key 751 is physically-embedded and read-only within CPU 701.

CPU 702 executes an Operating System (OS) that supports virtualization and/or containerization. CPU 702 executes Virtual Network Function (VNF) 731. VNF 731 has a hardware trust certificate, VPN ID and MAC ID. VNF 731 comprises a data communications service function chain that performs data networking tasks. Exemplary networking tasks include data packet handling, data network controls, and network applications. VNF 731 may be part of a base station, gateway, controller, data machine, database, or some other network element. Another CPU executes VNF 732. VNF 732 also has a hardware trust certificate, VPN ID and MAC ID.

I/O transceiver 711 comprises an I/O controller (CNT), ports, decryption circuitry, and encryption circuitry. I/O transceiver 711 uses IEEE 802.3. To handle crypto tasks, the encryption/decryption circuitry and the I/O controller in I/O transceiver 711 establish and share encryption keys with the encryption/decryption circuitry in other I/O transceivers.

NFV Management and Orchestration (MANO) 760 controls the execution of VNF 731 on CPU 702 in SOC 700. NFV MANO 760 may allocate VNF 731 the MAC ID and/or VPN ID. NFV MANO 760 controls the execution of VNF 732 and other VNFs in a similar fashion. NFV MANO 760 transfers NFV data to hardware trust server 750 that associates individual VNFs with their current SOCs, CPUs, MAC IDs, and VPNs. Hardware trust server 750 distributes crypto keys to the SOC kernels to decode and validate the hardware trust server's digital signature.

To maintain hardware trust of VNF 731, hardware trust server 750 issues a random number challenge to VNF 731—possibly through I/O transceiver 712 and the SOC kernel. VNF 731 requests hardware trust support from the SOC kernel based on the random number challenge. The SOC kernel reads hardware trust key 751 and hashes the random number with key 751 to generate a hardware trust result. The SOC kernel transfers the hardware trust result to VNF 731. VNF 731 transfers the hardware trust result along with its MAC ID and VPN ID to hardware trust server 750.

Based on its current NFV data, hardware trust server 750 generates its own hardware trust result with the random number and hardware trust key 751. Hardware trust server 750 matches the hardware trust result from VNF 731 with its own result to validate hardware trust of VNF 731 in NFV SOC 700. Hardware trust server 750 may also validate the MAC ID and VPN ID based on NFV data from MANO 760. In response to hardware trust validation, hardware trust server 750 issues the hardware trust certificate to VNF 731. The hardware trust certificate indicates hardware trust for VNF 731 and its MAC ID and VPN ID. The hardware trust certificate is time-stamped and digitally signed by hardware trust server 750. Hardware trust server 750 and VNF 731 repeat this process to refresh the hardware trust certificate. Hardware trust server 750 and VNF 732 perform a similar process to maintain the hardware trust certificate for VNF 732.

VNF 732 sends a hardware trusted data message to VNF 731 in SOC 700. The hardware trusted data message has a message header, encrypted user data, and an encrypted hardware trust certificate for VNF 732. I/O transceiver 711 receives the data message and the decryption circuitry decrypts the hardware trust certificate for VNF 732. The I/O controller in transceiver 711 transfers the decrypted hardware trust certificate for VNF 732 to the SOC kernel in CPU 701.

The SOC kernel activates its hardware trust kernel module. The hardware trust kernel module drives CPU 701 to decrypt and validate the hardware trust certificate for VNF 732. The validation includes checking the time-stamp from the hardware trust certificate for freshness. In response to the hardware trust of VNF 732, the SOC kernel directs its DMA controller to drive CPU 702 and I/O transceiver 711 to transfer decrypted user data to VNF 731 in CPU 702. I/O transceiver 711 decrypts the encrypted user data and transfers the decrypted user data to CPU 702. CPU 702 delivers the decrypted user data to VNF 731.

VNF 731 in SOC 700 returns a hardware trusted data message to VNF 732. The hardware trusted data message has a header, encrypted user data, and an encrypted hardware trust certificate for VNF 731. To initiate the data message, VNF 731 transfers its hardware trust certificate, MAC ID, and VPN ID in a data transfer request through the OS in CPU core 702 to the SOC kernel in CPU 701. In this example, the SOC kernel directs the hardware trust kernel module to validate the hardware trust certificate, MAC ID, and VPN ID for VNF 731. The hardware trust kernel module uses the public key of hardware trust server 750 to validate the trust certificate and check the time stamp for freshness. In response to the hardware trust of VNF 731, the SOC kernel directs the DMA to instruct CPU 702 and I/O transceiver 711 to transfer user data from VNF 731 in a hardware trusted data message to VNF 732.

The instructions direct the encryption circuitry in I/O transceiver 711 to encrypt the hardware trust certificate for VNF 731, encrypt the user data, and indicate encrypted hardware trust in the data message header. CPU 702 transfers the user data to I/O transceiver 711. The encryption circuitry in I/O transceiver 711 encrypts the user data and the hardware trust certificate for VNF 731. The hardware trust certificate includes the MAC ID and VPN ID for VNF 731. I/O transceiver 711 transfers the hardware trusted data message to VNF 732. The data message transports the encrypted user data and the encrypted hardware trust certificate for VNF 731.

The use of hardware trusted communications in NFV SOC 700 is selective. For example, the data message may have a flag, address, port, or some other marker that directs transceiver 711 to perform the hardware trust break-out and validation through the SOC kernel. This selective use of hardware trusted communications is implemented for special commands between VNFs like SDN signaling and WoL commands.

Figure 8:
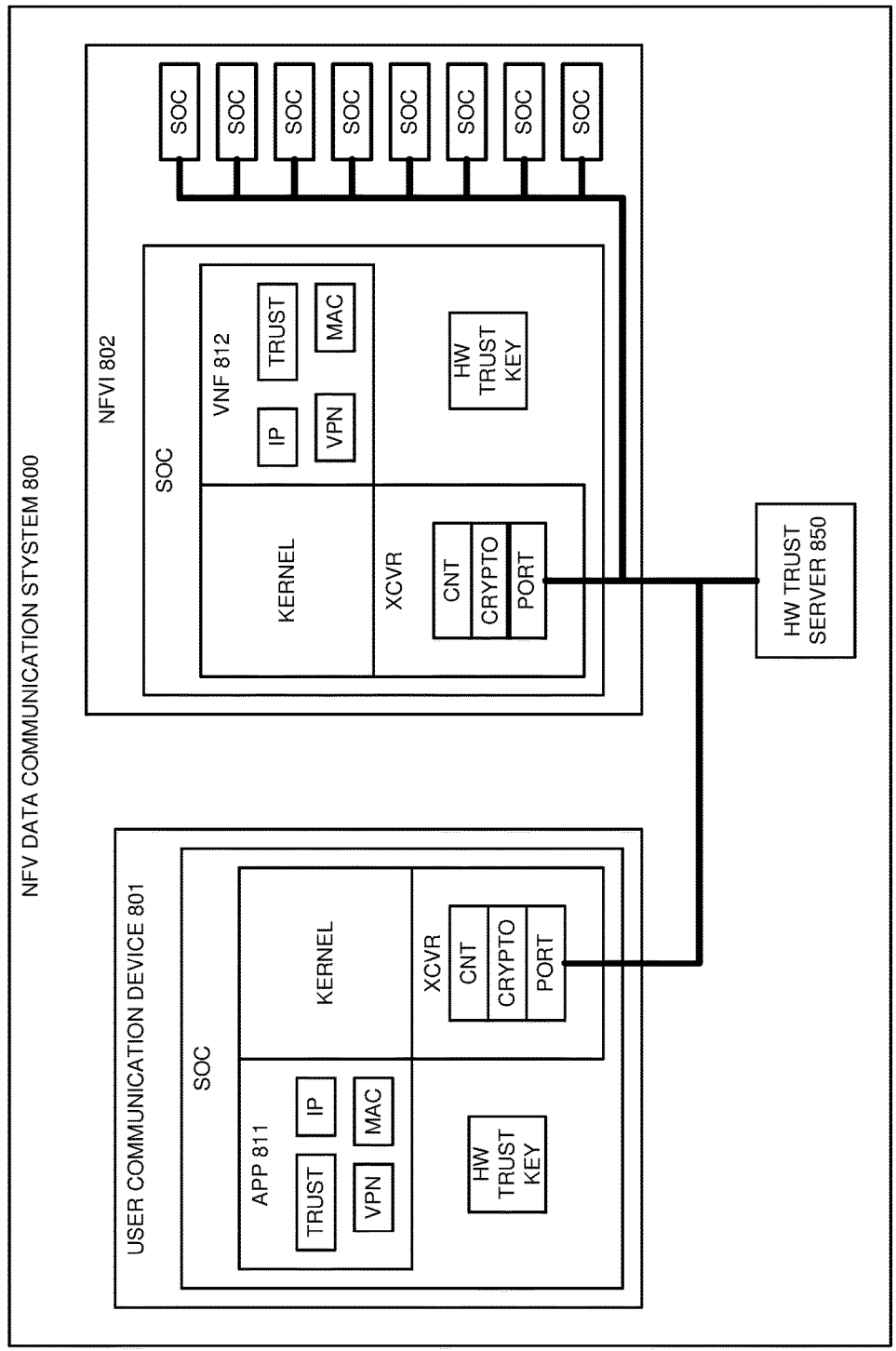
FIG. 8 illustrates an NFV data communication system to exchange hardware trusted data communications.

FIG. 8 illustrates NFV data communication system 800 to exchange hardware trusted data communications. NFV data communication system 800 comprises user communication device 801, NFV Infrastructure (NFVI) 802, and hardware trust server 850. User communication device 801 could be a phone, computer, or some other intelligent machine with data communication components. User communication device 801 has a SOC that comprises a kernel, transceiver, hardware trust key, and application 811 (the CPUs are omitted for clarity). The transceiver has a port, crypto circuitry, and controller (CNT). Application 811 has a hardware trust certificate, MAC ID, VPN ID, and Internet Protocol (IP) address.

NFVI 802 comprises multiple SOCs and the number is drastically reduced for clarity. The exemplary and illustrated NFVI SOC comprises a kernel, transceiver, hardware trust key and VNF 812 (the CPUs are omitted for clarity). The transceiver has a port, crypto circuitry, and controller. VNF 812 has a hardware trust certificate, MAC ID, VPN ID, and IP address. VNF 812 may comprise a data communications service function chain.

Hardware trust server 850 issues random number challenges to application 811 and VNF 812. Application 811 and VNF 812 request hardware trust handling from their SOC kernels. The SOC kernels hash their hardware trust keys with the random numbers to generate hardware trust results. The SOC kernels transfer the hardware trust result to application 811 and VNF 812. Application 811 and VNF 812 transfer the hardware trust results along with their MAC ID, VPN ID, and IP addresses to hardware trust server 850.

Based on NFV MANO data, hardware trust server 850 generates its own hardware trust results with the random numbers and the hardware trust keys. Hardware trust server 850 matches the hardware trust results from application 811 and VNF 812 with its own results to validate hardware trust of application 811 and VNF 812. In response to hardware trust validation, hardware trust server 850 issues the hardware trust certificates to application 811 and VNF 812. The hardware trust certificates indicate hardware trust, MAC ID, VPN ID, and IP address. The hardware trust certificates are time-stamped and digitally signed by hardware trust server 850.

Figure 9:
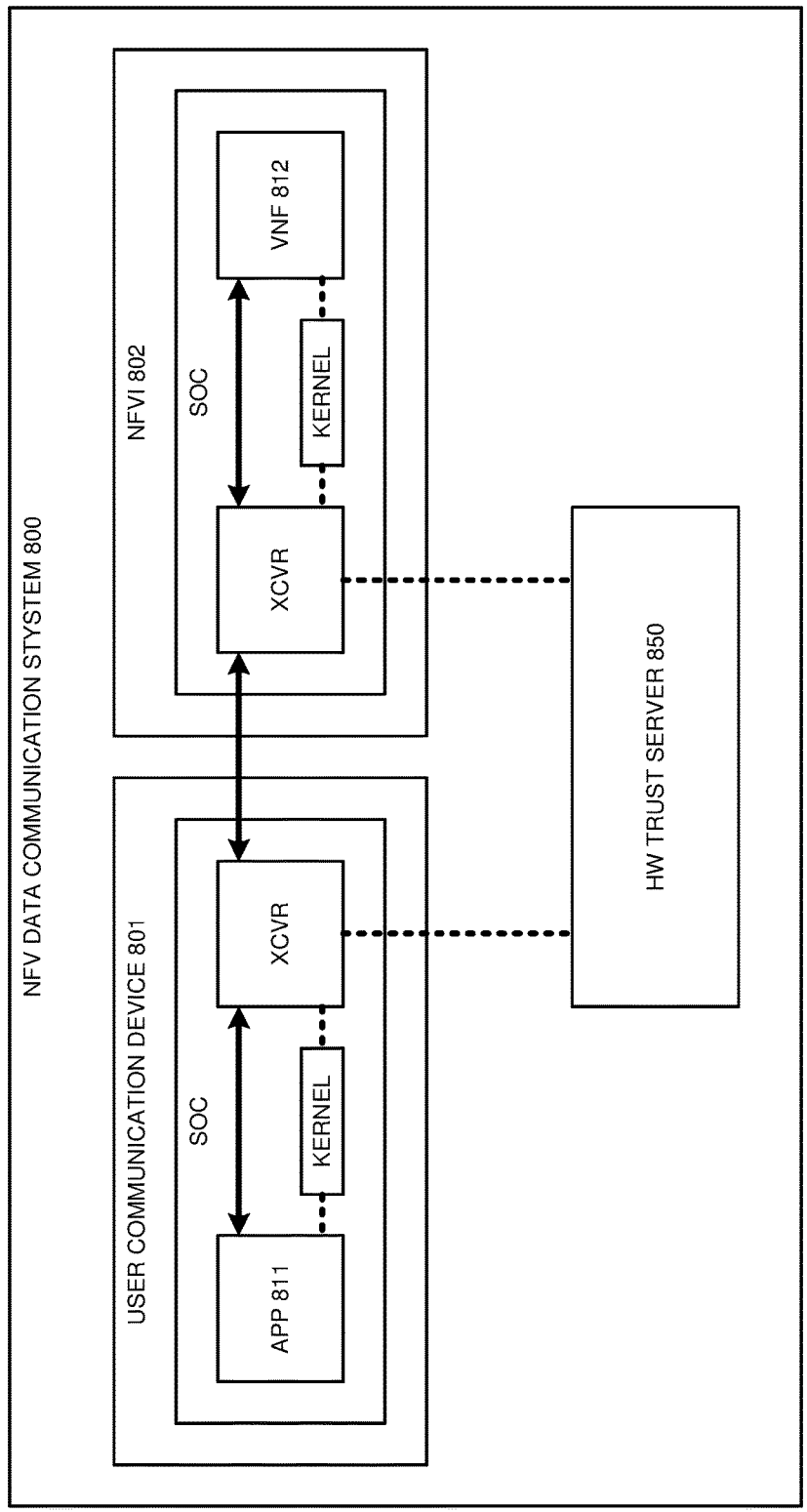
FIG. 9 illustrates the operation of the NFV data communication system to exchange hardware trusted data communications.

FIG. 9 illustrates the operation of NFV data communication system 800 to exchange hardware trusted data communications. Application 811 in user communication device 801 sends a hardware trusted data message for delivery to VNF 812 in NFVI 802. To initiate the data message, application 811 transfers its hardware trust certificate, MAC ID, VPN ID, and IP address in a data transfer request to the SOC kernel. The SOC kernel uses the public key of hardware trust server 850 to validate the hardware trust certificate for application 811. In response to the hardware trust of application 811, the SOC kernel transfers instructions to the transceiver to transfer user data from application 811 in a hardware trusted data message to VNF 812. The transceiver encrypts the hardware trust certificate for application 811, encrypts the user data, and indicates encrypted hardware trust in the data message header. The transceiver in user communication device 801 transfers the hardware trusted data message to the transceiver in NFVI 802.

The SOC transceiver in NFVI 802 receives the data message and decrypts the hardware trust certificate for application 811. The transceiver transfers the decrypted hardware trust certificate for application 811 to the SOC kernel. The SOC kernel validates the decrypted hardware trust certificate for application 811. In response to the hardware trust of application 811, the SOC kernel transfers an instruction to the transceiver to transfer decrypted user data to VNF 812. The transceiver decrypts the encrypted user data and transfers the decrypted user data to VNF 812.

Subsequently, VNF 812 returns a hardware trusted data message to application 811. To initiate the return message, VNF 812 transfers its hardware trust certificate, MAC ID, VPN ID, and IP address in a data transfer request to its SOC kernel. The NFVI SOC kernel uses the public key of hardware trust server 850 to validate the hardware trust certificate for VNF 812. In response to the hardware trust of VNF 812, the SOC kernel transfers instructions to the transceiver to transfer user data from VNF 812 in a hardware trusted data message to application 811. The transceiver encrypts the hardware trust certificate for VNF 812, encrypts the user data, and indicates encrypted hardware trust in the data message header. The transceiver in NFVI 802 transfers the hardware trusted data message to the transceiver in user communication device 801.

The SOC transceiver in user communication device 801 receives the data message and decrypts the hardware trust certificate for VNF 812. The transceiver transfers the decrypted hardware trust certificate for VNF 812 to the SOC kernel. The SOC kernel validates the decrypted hardware trust certificate for VNF 812. In response to the hardware trust of VNF 812, the SOC kernel transfers an instruction to the transceiver to transfer decrypted user data to application 811. The transceiver decrypts the encrypted user data and transfers the decrypted user data to application 811.

Figure 10:
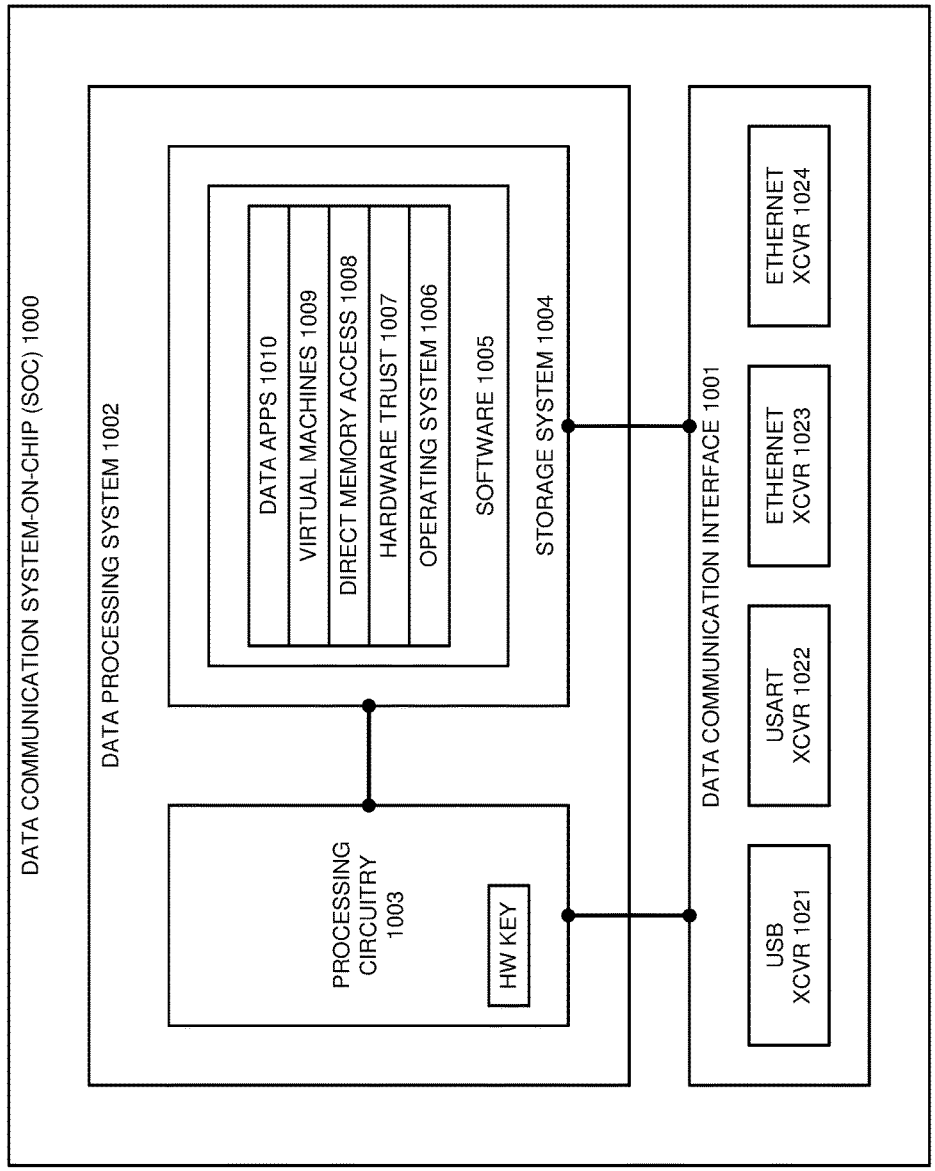
FIG. 10 illustrates a data communication SOC to exchange hardware trusted data communications.

FIG. 10 illustrates data communication SOC 1000 to exchange hardware trusted data communications. SOC 1000 is an example of the SOCs described above, although those SOCs may use alternative configurations and operations. SOC 1000 comprises data communication interface 1001 and data processing system 1002. Data communication interface 1001 comprises transceivers 1021-1024 for USB, USART, and Ethernet. Data processing system 1002 comprises processing circuitry 1003 and storage system 1004. Storage system 1004 stores software 1005. Software 1005 includes respective software modules 1006-1010.

Transceivers 1021-1024 comprises communication components, such as amplifiers, filters, modulators, signal processors, ports, bus interfaces, memory, software, and the like. Transceivers 1021-1024 perform separate hardware based encryption and decryption on user data and hardware trust certificates. Processing circuitry 1003 comprises CPU cores and RAM. Storage system 1004 comprises non-transitory, machine-readable, data storage media, such as flash drives, memory circuitry, and the like. Software 1005 comprises machine-readable instructions that control the operation of processing circuitry 1003 when executed.

All or portions of software 1006-1010 may be externally stored on one or more storage media, such as circuitry, discs, and the like. Some conventional aspects of SOC 1000 are omitted for clarity, such as power supplies, substrate, and the like. When executed by processing circuitry 1003, software modules 1006-1010 direct circuitry 1003 to perform the following operations.

Operating system 1006 has a kernel to interface between software modules 1007-1010 and the SOC hardware (processing circuitry 1003, data communication interface 1001, storage). Hardware trust 1007 supports hardware trust testing, validation, and transceiver control. Direct Memory Access 1008 directs the exchange of user data between data communication interface 1001 and storage system 1004 under the control of hardware trust 1007. Virtual machines 1009 interact between operating system 1006 and data applications 1010. Data applications 1010 interact with virtual machines 1009 to exchange hardware trusted data communications.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a data communication System-On-Chip (SOC) to exchange hardware trusted data communications, the method comprising:
a Central Processing Unit (CPU) executing an internal data application;
an Input/Output (I/O) transceiver receiving a data message from an external data application for delivery to the internal data application, the data message having encrypted user data and an encrypted hardware trust certificate for the external data application;
the I/O transceiver decrypting the encrypted hardware trust certificate for the external data application and transferring the decrypted hardware trust certificate for the external data application to a SOC kernel;
the I/O transceiver decrypting the encrypted user data;
the SOC kernel validating the decrypted hardware trust certificate for the external data application and notifying the I/O transceiver;
responsive to the notification from the SOC kernel, the I/O transceiver transferring the decrypted user data for delivery to the internal data application; and
the CPU delivering the decrypted user data to the internal data application.

2. The method of claim 1 wherein the encrypted user message has an encrypted Media Access Control Identifier (MAC ID) for the external data application and further comprising:
the I/O transceiver decrypting the encrypted MAC ID for the external data application and transferring the decrypted MAC ID for the external data application to the SOC kernel; and
the SOC kernel validating the decrypted MAC ID for the external data application.

3. The method of claim 1 wherein the encrypted user message has an encrypted Virtual Private Network Identifier (VPN ID) for the external data application and further comprising:
the I/O transceiver decrypting the encrypted VPN ID for the external data application and transferring the decrypted VPN ID for the external data application to the SOC kernel; and
the SOC kernel validating the decrypted VPN ID for the external data application.

4. The method of claim 1 wherein the encrypted user message has an encrypted hardware trust certificate for the internal data application and further comprising:
the I/O transceiver decrypting the encrypted hardware trust certificate for the internal data application and transferring the decrypted hardware trust certificate for the internal data application to the SOC kernel; and
the SOC kernel validating the decrypted hardware trust certificate for the internal data application.

5. The method of claim 1 further comprising:
the CPU receiving additional user data and a hardware trust certificate for the internal data application from the internal data application for delivery to the external data application;
the CPU transferring the hardware trust certificate for the internal data application to the SOC kernel and transferring the additional user data to the I/O transceiver;
the SOC kernel transferring the hardware trust certificate to the I/O transceiver; and
the I/O transceiver encrypting the additional user data and the hardware trust certificate and transferring another data message for delivery to the external data application having the encrypted additional user data and the encrypted hardware trust certificate for the internal data application.

6. The method of claim 5 further comprising the SOC kernel validating the hardware trust certificate for the internal data application.

7. The method of claim 5 further comprising:
the CPU receiving the hardware trust certificate for the external data application from the internal data application and transferring the hardware trust certificate for the external data application to the SOC kernel;
the SOC kernel transferring the hardware trust certificate for the external data application to the I/O transceiver; and
the I/O transceiver encrypting the encrypting and transferring the hardware trust certificate for the external data application in the other data message.

8. The method of claim 5 further comprising:
the CPU receiving a Media Access Control Identifier (MAC ID) for the internal data application from the internal data application and transferring the MAC ID for the internal data application to the SOC kernel;
the SOC kernel transferring the MAC ID for the internal data application to the I/O transceiver; and
the I/O transceiver encrypting and transferring the MAC ID for the internal data application in the in the other data message.

9. The method of claim 5 further comprising:
the CPU receiving a Virtual Private Network Identifier (VPN ID) for the internal data application from the internal data application and transferring the VPN ID for the internal data application to the SOC kernel;
the SOC kernel transferring the VPN ID for the internal data application to the I/O transceiver; and
the I/O transceiver encrypting and transferring the VPN ID for the internal data application in the other data message.

10. The method of claim 1 wherein the internal data application comprises a Network Function Virtualization Virtual Network Function (NFV VNF).

11. A data communication System-On-Chip (SOC) to exchange hardware trusted data communications, the data communication SOC method comprising:
a Central Processing Unit (CPU) configured to execute an internal data application;
an Input/Output (I/O) transceiver configured to receive a data message from an external data application for delivery to the internal data application, the data message having encrypted user data and an encrypted hardware trust certificate for the external data application;
the I/O transceiver configured to decrypt the encrypted hardware trust certificate for the external data application and transfer the decrypted hardware trust certificate for the external data application to a SOC kernel;
the I/O transceiver configured to decrypt the encrypted user data;
the SOC kernel configured to validate the decrypted hardware trust certificate for the external data application and notify the I/O transceiver;
the I/O transceiver configured, responsive to the notification from the SOC kernel, to transfer the decrypted user data for delivery to the internal data application; and
the CPU configured to deliver the decrypted user data to the internal data application.

12. The data communication SOC of claim 11 wherein the encrypted user message has an encrypted Media Access Control Identifier (MAC ID) for the external data application and further comprising:
the I/O transceiver configured to decrypt the encrypted MAC ID for the external data application and transfer the decrypted MAC ID for the external data application to the SOC kernel; and
the SOC kernel configured to validate the decrypted MAC ID for the external data application.

13. The data communication SOC of claim 11 wherein the encrypted user message has an encrypted Virtual Private Network Identifier (VPN ID) for the external data application and further comprising:
the I/O transceiver configured to decrypt the encrypted VPN ID for the external data application and transfer the decrypted VPN ID for the external data application to the SOC kernel; and
the SOC kernel configured to validate the decrypted VPN ID for the external data application.

14. The data communication SOC of claim 11 wherein the encrypted user message has an encrypted hardware trust certificate for the internal data application and further comprising:
the I/O transceiver configured to decrypt the encrypted hardware trust certificate for the internal data application and transfer the decrypted hardware trust certificate for the internal data application to the SOC kernel;
the SOC kernel configured to validate the decrypted hardware trust certificate for the internal data application.

15. The data communication SOC of claim 11 wherein:
the CPU is configured to receive additional user data and a hardware trust certificate for the internal data application from the internal data application for delivery to the external data application;
the CPU is configured to transfer the hardware trust certificate for the internal data application to the SOC kernel and to transfer the additional user data to the I/O transceiver;
the SOC kernel is configured to transfer the hardware trust certificate for the internal data application to the I/O transceiver; and
the I/O transceiver is configured to encrypt the additional user data and the hardware trust certificate and transfer another data message for delivery to the external data application having the encrypted additional user data and the encrypted hardware trust certificate for the internal data application.

16. The data communication SOC of claim 15 wherein the SOC kernel is configured to validate the hardware trust certificate for the internal data application.

17. The data communication SOC of claim 15 further comprising:

the CPU configured to receive the hardware trust certificate for the external data application from the internal data application and transfer the hardware trust certificate for the external data application to the SOC kernel;

the SOC kernel configured to transfer the hardware trust certificate for the external data application to the I/O transceiver; and the I/O transceiver configured to encrypt and transfer the hardware trust certificate for the external data application in the other data message.

18. The data communication SOC of claim 15 further comprising:

the CPU configured to receive a Media Access Control Identifier (MAC ID) for the internal data application from the internal data application and transfer the MAC ID for the internal data application to the SOC kernel;

the SOC kernel configured to transfer the MAC ID for the internal data application to the I/O transceiver; and the I/O transceiver configured to encrypt and transfer the MAC ID for the internal data application in the other data message.

19. The data communication SOC of claim 15 further comprising:

the CPU configured to receive a Virtual Private Network Identifier (VPN ID) for the internal data application from the internal data application and transfer the VPN ID for the internal data application to the SOC kernel;

the SOC kernel configured to transfer the VPN ID for the internal data application to the I/O transceiver; and the I/O transceiver configured to encrypt and transfer the VPN ID for the internal data application in the other data message.

20. The data communication SOC of claim 11 wherein the internal data application comprises a Network Function Virtualization Virtual Network Function (NFV VNF).

* * * * *